A. AND H. D. TAYLOR AND P. W. GRAY.
INDIRECT VISION RANGE FINDER AND THE LIKE INSTRUMENT.
APPLICATION FILED JAN. 29, 1916.
1,429,981.
Patented Sept. 26, 1922.
8 SHEETS—SHEET 6.
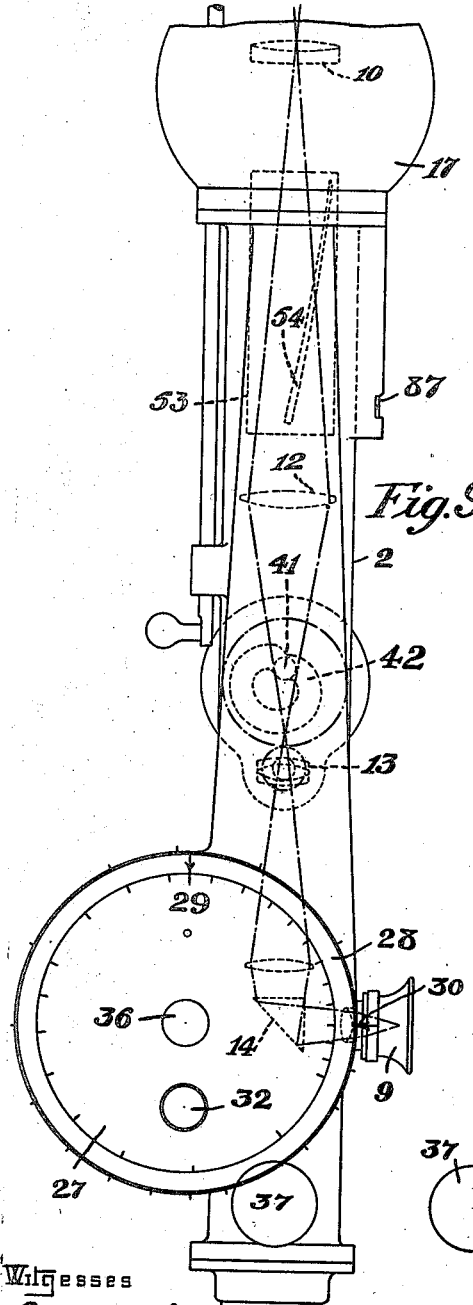
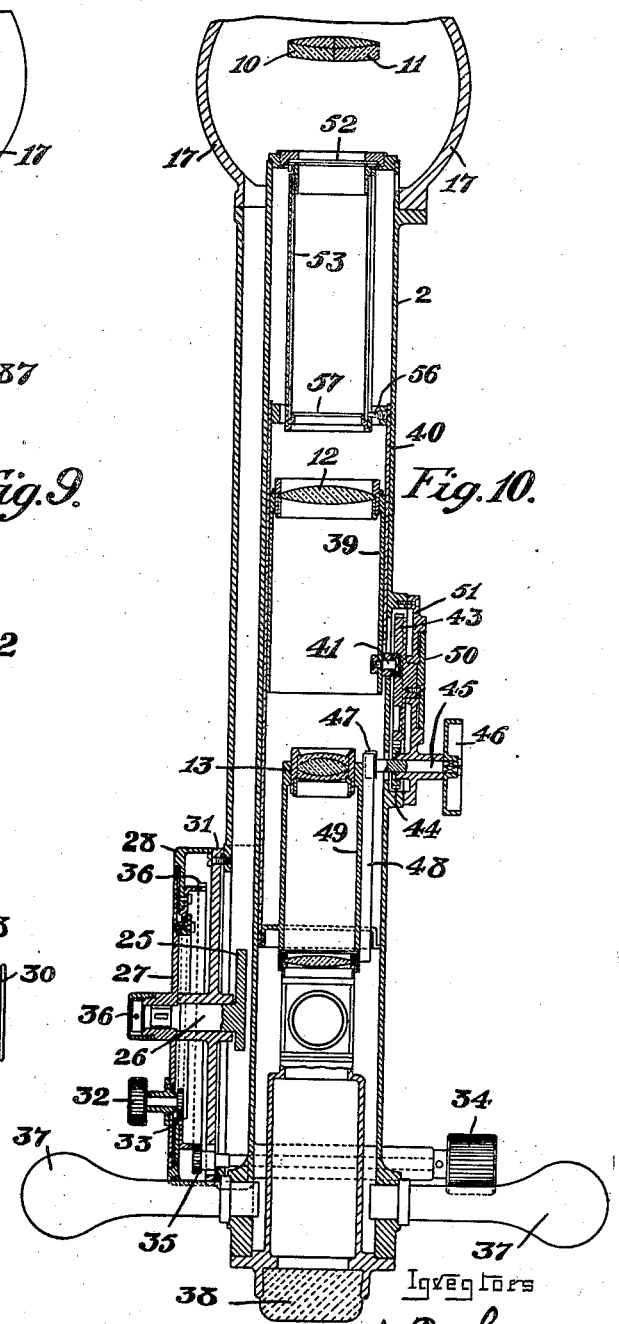

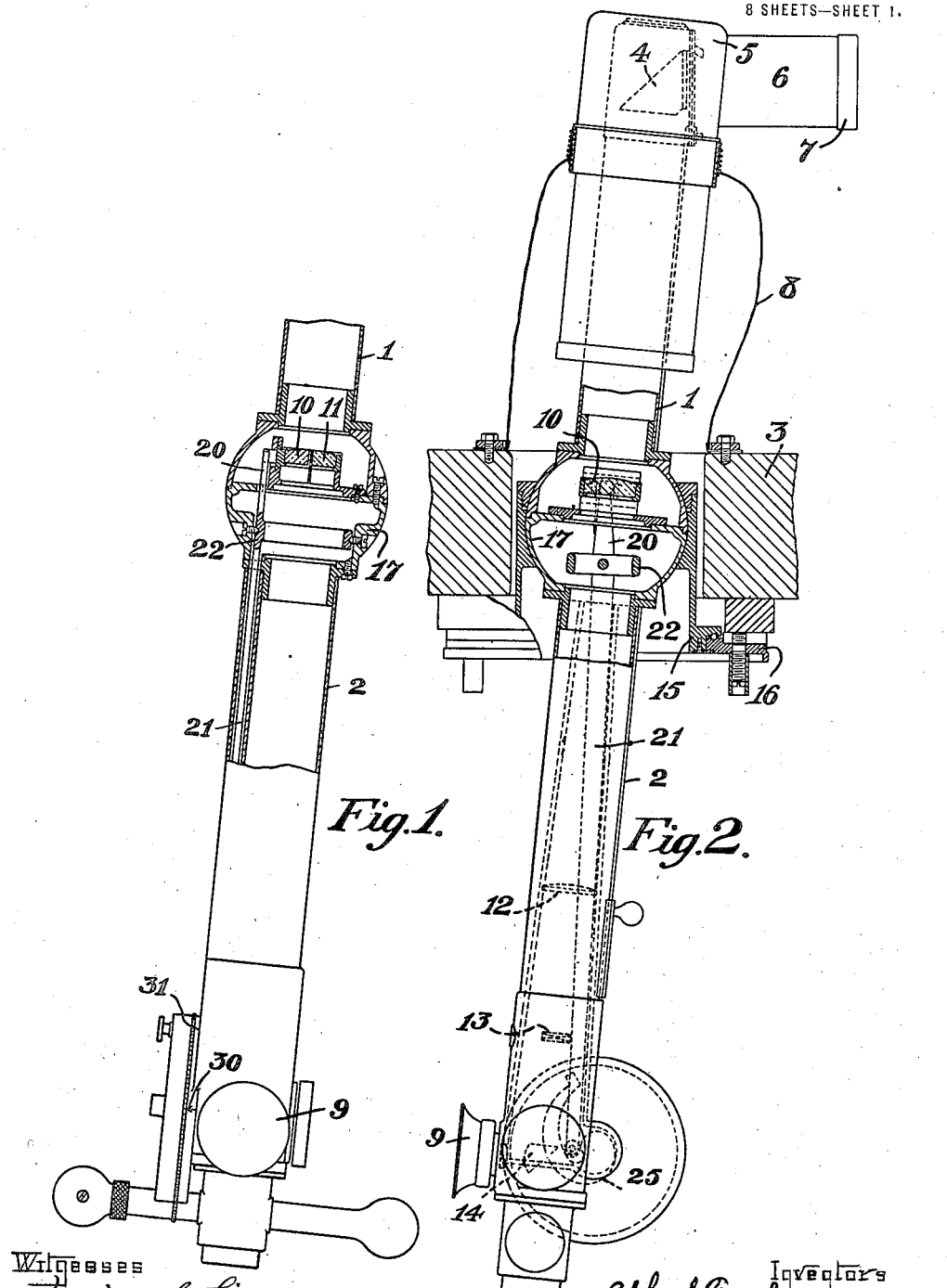

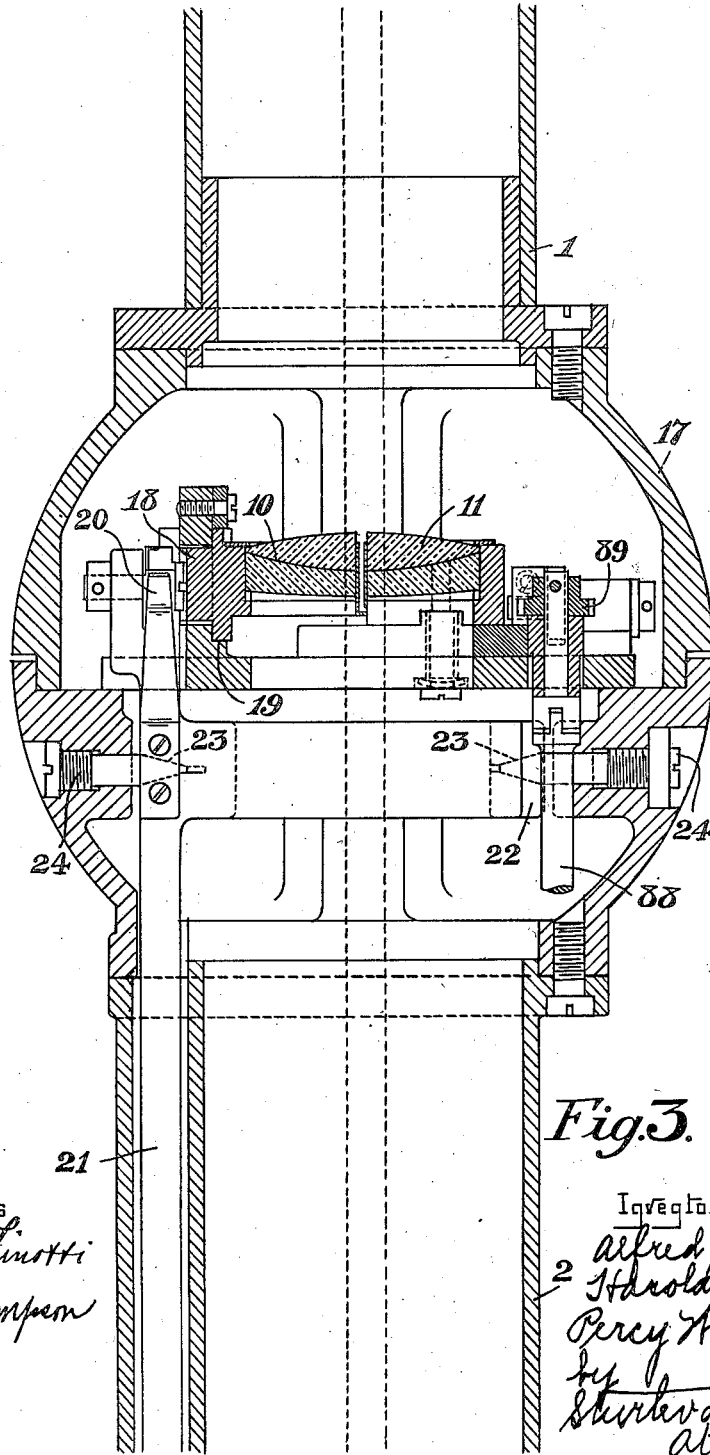

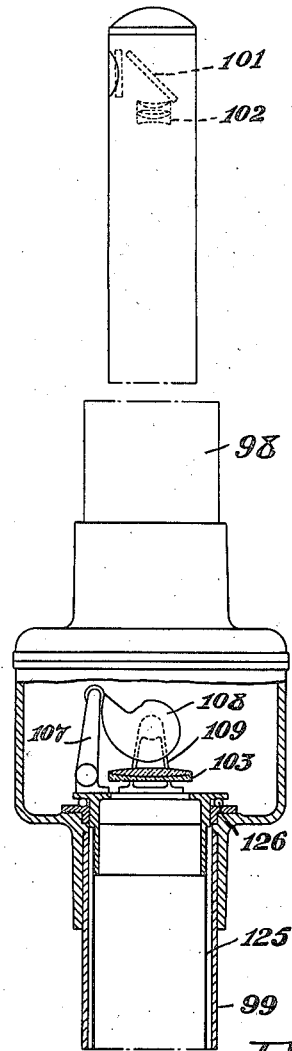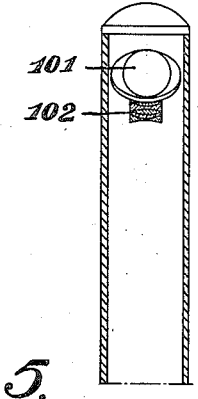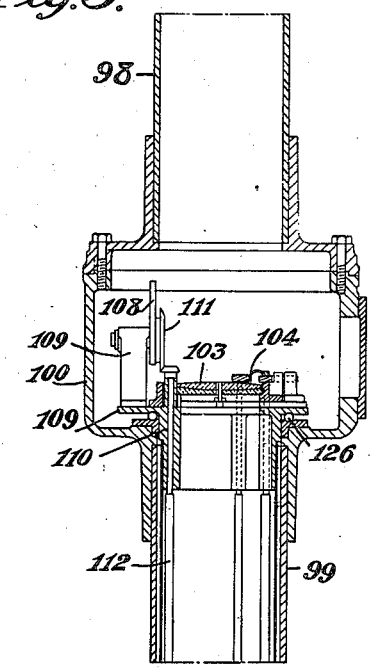

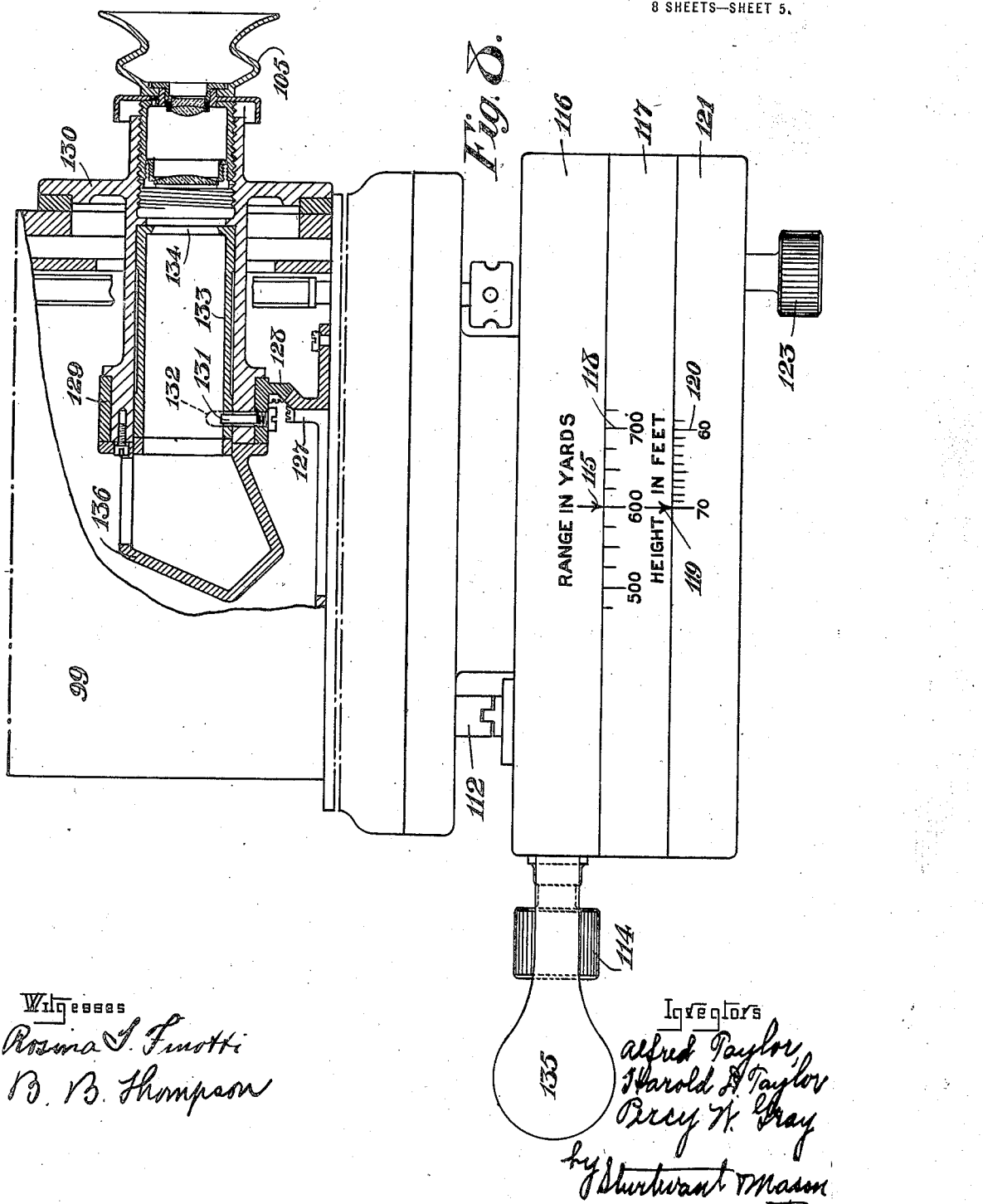

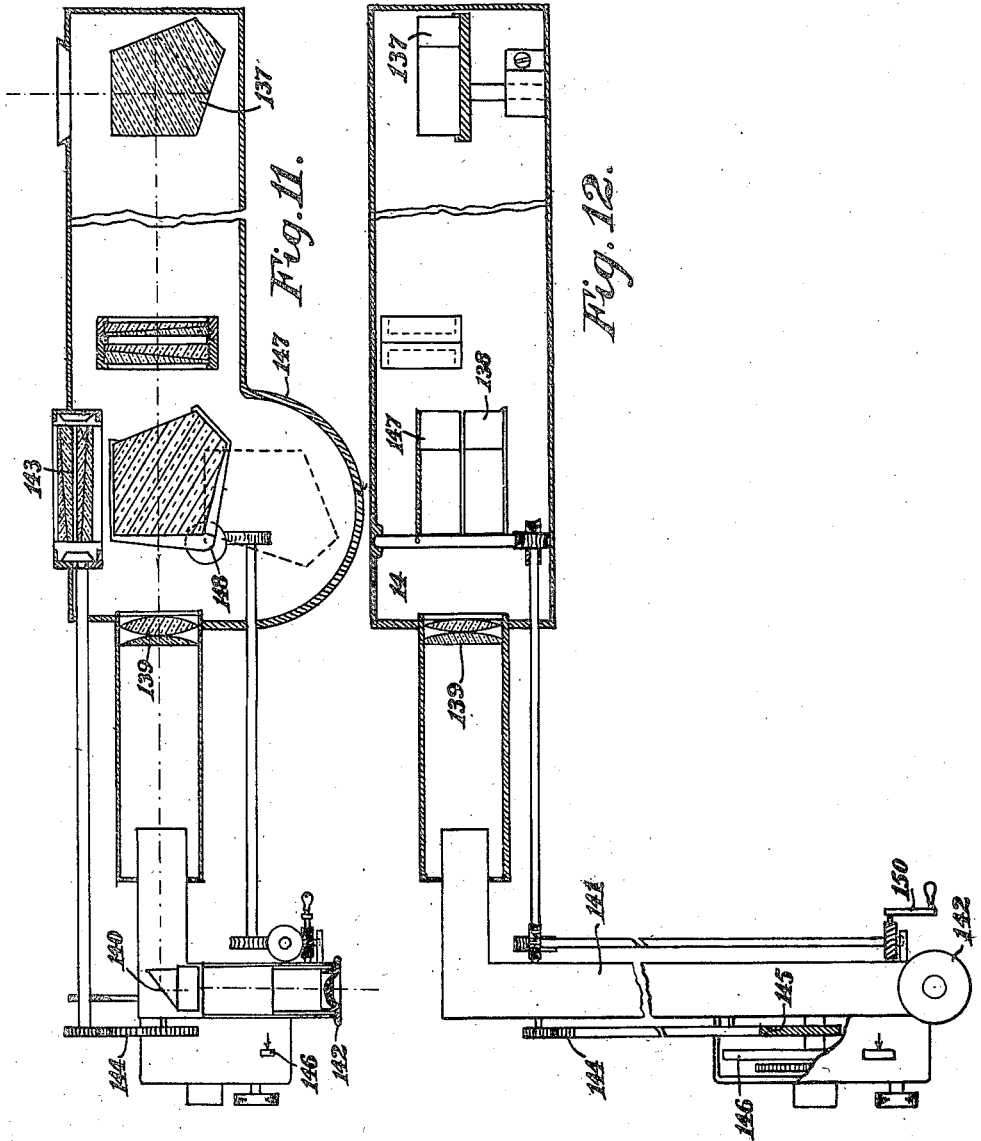

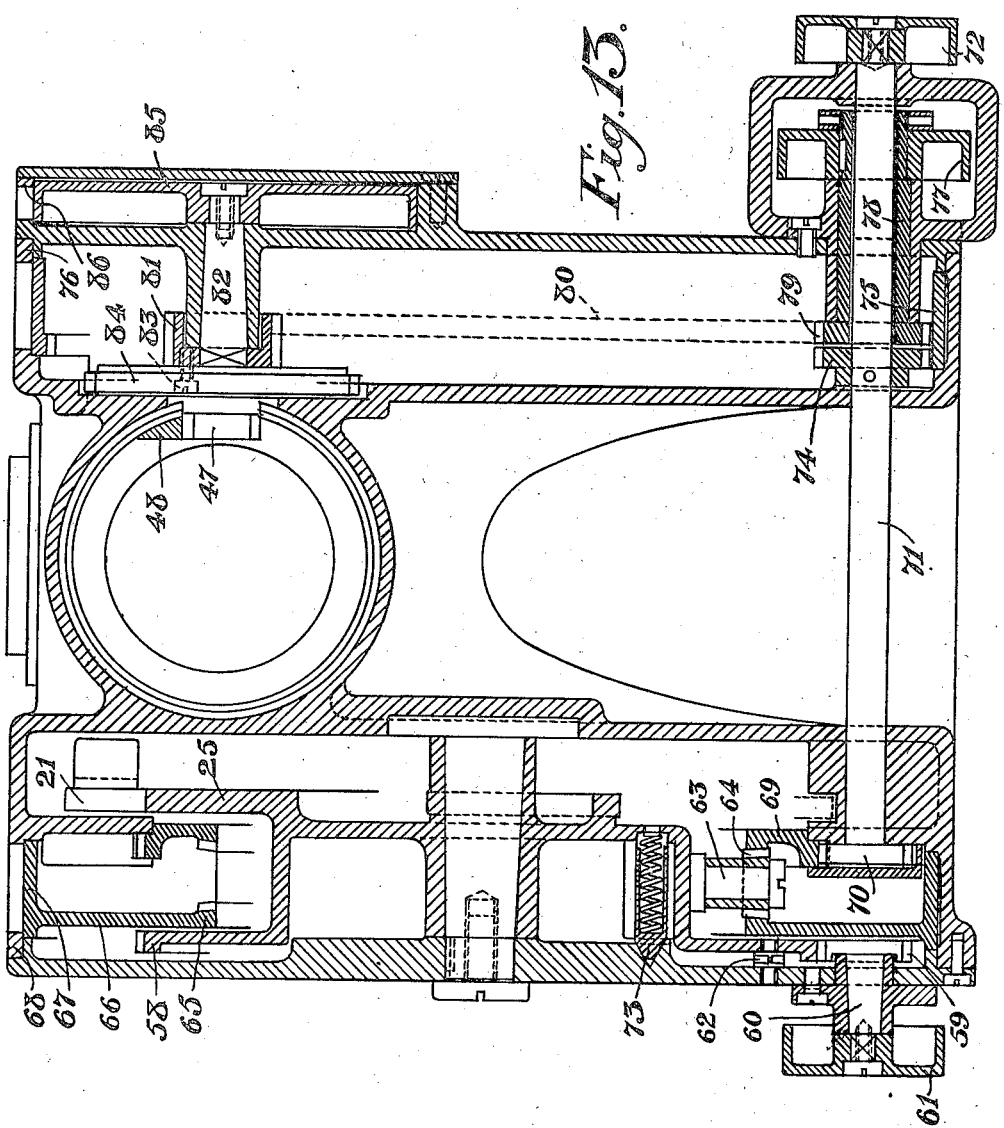

Patented Sept. 26, 1922.

1,429,981

UNITED STATES PATENT OFFICE.

ALFRED TAYLOR, HAROLD DENNIS TAYLOR, AND PERCY WILLIS GRAY, OF YORK, ENGLAND.

INDIRECT-VISION RANGE FINDER AND THE LIKE INSTRUMENT.

Application filed January 29, 1916. Serial No. 75,169.

*To all whom it may concern:*

Be it known that we, ALFRED TAYLOR, HAROLD DENNIS TAYLOR, and PERCY WILLIS GRAY, subjects of the King of Great Britain, residing at York, in the county of York, in the Kingdom of England, have invented certain new and useful Improvements in Indirect-Vision Range Finders and the like Instruments, applications having been filed in Great Britain, Nos. 23,416, December 2, 1914; 268, January 7, 1915; 9,468, June 29, 1915; 11,183, August 3, 1915; 13,476, September 22, 1915; 16,043, November 13, 1915; France, December 2, 1915; Italy, December 20, 1915, and of which the following is a specification.

The present invention relates to improvements in range finders and the like instruments.

The present instrument is applicable especially to gun turrets of battleships and to submarines, but it may obviously also be applied to any position where indirect sighting is desirable, for instance, in the indirect sighting of ordnance for use in military trenches or other covered positions.

According to the present invention the optical systems of a range finding apparatus having a deflectable optical element, and of a periscope, are co-ordinated so that the number of the elements of the combined instrument is reduced, a single eyepiece being arranged for both range finder and periscope. Further controlling means are provided so that normal vision through the eyepiece shows the whole uninterrupted periscope field of view during inaction of the range finder.

In one of the particular constructions described by way of example below the optical elements of a range finder and a periscope are assembled into a single system, as the range finder selected is of the split object glass type allowing in the zero position uninterrupted vision; simultaneously allowing by displacement of the movable half of the object glass, use of the instrument as a periscopic range finder. It is obvious that instead of splitting the object glass in such a composite instrument any other optical element may be sub-divided for the purposes of range finding, for instance, one of the reflecting prisms of the optical system of the periscope.

As applied to a submarine or a gun turret the instrument may either be incorporated with the usual periscope or be a separate instrument thereto. The range finder parts where these are of a telescopic nature, could be directly mounted in the periscope tube, the eyepiece of the usual telescope portion of such a range finder also forming the eyepiece or observation portion of the usual periscope. In certain cases the instrument may be of the type in which a certain fixed horizontal distance can be used as the fixed base. The invention will however be more particularly described with reference to a construction in which the height of an observed object is considered as the fixed base for the purposes of obtaining the range. This finds particular applicability to marine purposes in which case a height of a mast or like part of a ship under observation forms the known element of the trigonometrical equation to be solved in the obtaining of the range, this equation being the well known form—log of the known height—log-tan of the observed angle=log of the range.

One form of instrument for obtaining ranges according to this equation is of the divided object glass type in which the base point of the sighted object is viewed through the fixed half of the object glass and then the movable half of the object glass is displaced to bring the top point of the observed object into coincidence or in line with the image viewed through the fixed half, the angle of deflection of the movable half of the object glass then forming or being a direct function of the angle of elevation of the top of the observed mast.

Particularly where applied to a submarine, or like moving object, means are preferably combined with such a periscopic range finder to correct for foreshortening due to the inclination of the periscopic tube. Such means may be automatic directed by a gravity control or may be hand-operated, from direct observation through the instrument.

It is also desirable in such indirect sighting range finding apparatus to provide a pancratic eye-piece or other means for altering the magnifying power of the instrument so that the field of view may be enlarged to pick up a desired object and then restored to normal or other desired value when such object has been found. Further improvements relate to optical constructions to allow for higher accuracy and efficiency of periscopic observation of such range finding instruments.

The present invention is more particularly described with reference to the accompanying drawings, in which:—

Figure 1 is a view in end elevation of an officer's look-out periscope instrument.

Figure 2 is a corresponding view in side elevation.

Figure 3 is a view on a large scale of the displaceable sighting element of the range finder according to Figures 1 and 2 and the adjacent parts.

Figure 4 is a front elevation partly in section of the improved range finding instrument particularly adaptable for submarines.

Figure 5 is a side sectional view corresponding to Figure 4.

Figure 8 is a view on an enlarged scale of part of the range finder of Figures 4 and 5.

Figure 9 is an outside elevation on an enlarged scale of the form of construction of Figures 1 and 2.

Figure 10 is a side elevation in section corresponding to Figure 9.

Figure 11 is a side elevation of a further modification; whilst

Figure 12 is a sectional view taken at right angles to Figure 11.

Figure 6:
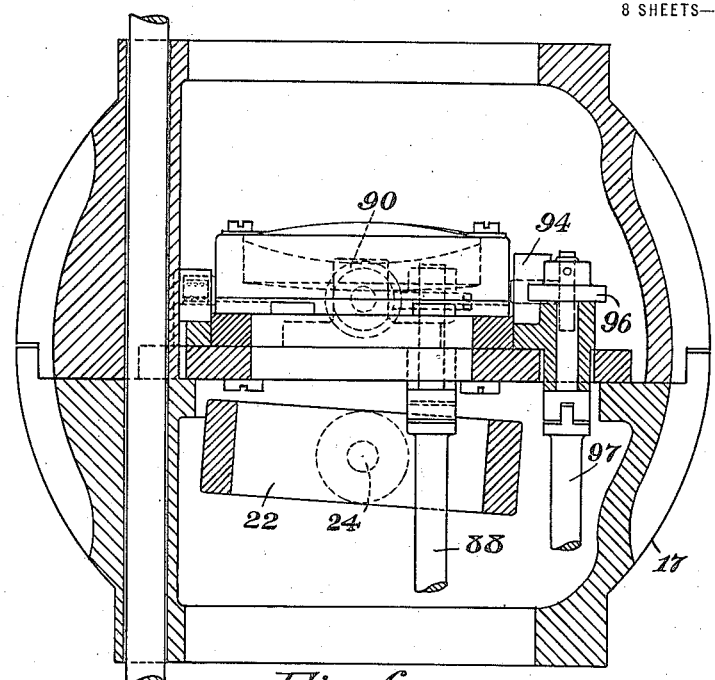
Figure 6 is a sectional elevation on an enlarged scale of the displaceable element of the range finder and adjacent parts.

Figure 13 shows a modification of part of the device shown in Figures 1 and 2, and 9 and 10.

The construction illustrated in Figures 1 and 2 is particularly adapted for battleship and the like gun turret work where a periscope tube 1, 2, is provided extending above the upper edge of the turret 3, as is usual. The upper end 1 of the periscope tube carries an arrangement for reflecting the observed light ray through 90° or other suitable angle. This reflecting means can be either in the form of a mirror or in the form of a prism 4, the latter being preferred. The prism 4 or the like is mounted in a cap 5 and is capable of rotation to cover the whole field of view as the periscope tube 1, 2, is mounted on a ball joint allowing movement of the tube 1, 2, about its axis and at any desired inclination between predetermined limits to the supporting part of the turret 3.

The element 4 and cap 5 can of course in an alternative arrangement be made the sole rotatable portion of the instrument.

The cap 5 is provided with rain hood and spray excluder 6, the outer end of which can be provided with a removable cap 7 to enclose and protect the arrangement when not in use.

The portion 1 of the periscopic tube lying above the deck can be provided with a spray excluder of canvas or the like 8 to avoid sea water acting on the movable parts of the instrument, such as the ball joint, which would otherwise be exposed.

Rays of light from the object out of direct observation by the observer at the eyepiece 9 will be reflected by the mirror, prism or the like 4 at the top 1 of the periscope tube and then downwards through the tube through the optical elements 10, 11 of the range finder. The rays of light will thence further pass through optical elements 12, 13 which preferably will be such as to form a means for varying the magnifying power; then being reflected by means of a prism or the like 14 into the eyepiece 9 of any desired construction.

It is obvious of course that instead of having an object glass of portions 10, 11 movable in the same lateral plane, this may be of any other form, a modification which may be suggested consisting of prisms one of which will be displaceable along the axis of observation, or of course alternatively at right angles thereto. Also again, for the members 10, 11 there may be substituted prisms one of which is adapted to be pivoted about an axis for range finding purposes.

The periscope tube 1, 2 is supported by the part 3 of a battleship gun turret upon a frame 15 running on ball bearings on a carrier 16 accurately disposed relatively to the turret 3. The frame 15 forms one element or casing of a ball joint the other spherical surface of which is carried by a portion 17 on the elements 1, 2 of the periscope tube, an adjustable nut packing or the like means allowing the periscope tube to be inclined at any desired angle to the axis of the vessel.

In the construction shown the sliding portion 10 of the object glass is mounted in a frame 18 (Figure 3) slidable in guides 19 carried by the joint 17 so that the element 10 can be slid in a plane at right angles to the axis of observation, through the elements 10, 11. The frame 18 is provided with a forked arm on one side engaging with the upper end 20 of a cam lever the lower arm 21 of which co-operates with the cam of a range finding apparatus, as will be more particularly hereinafter described. The lever 20, 21, has an integral hollow bridge 22 to allow of support on opposite sides of the ball joint 17 without interference with passage of light, the bridge 22 being provided with bearings 23 for pins 24.

The lower end 21 of the cam lever 20, 21, is adapted to be operated by a cam 25 (Figure 2). In the case in which this is a face cam as shown, a spring or the like means can be provided for holding the end of the arm 21 of the cam lever in engagement with the face of the cam 25.

The cam 25 is mounted on a spindle 26 (Figure 10) which has connected to it a circular scale 27 graduated to correspond to a logarithmic scale of distances or ranges. Co-operating therewith is an annular logarithmic scale 28 having an index 29 and graduations on its outer edge co-operating with a fixed index 30 on the edge of the casing 31 of the instrument. The annular scale 28 can be turned by operation of a milled head 32 having a pinion 33 gearing with an internal rack on the annular scale 28 so that the fixed index on the casing 31 will come opposite values on the outer edge of the scale 28 corresponding to various set lengths or "mast heights." The circular scale 27 can be rotated together with the annular scale 28 and cam 25 relatively to the casing 31 by means of a knob 34 on a shaft carrying a pinion 35 engaging a circular rack 36 carried by the element 28. The two scales with the cam 25 can be turned as one member relatively to the casing 31 also by gripping the outer knob end 36 covering the end of the shaft 26.

The lower end 2 of the periscope tube carries handles 37 to allow the whole periscope to be rotated about the ball joint 17 to sight any element in the horizontal field of view. The lower end 2 of the tube is preferably provided with a pad 38 of rubber or the like so that the observer may steady the tube by pressing his body against it.

In the operation of the device the periscope tube 1, 2, is rotated by the handles 37 until the object sighted comes into the field of view of the eyepiece 9. One point along a certain fixed line, for instance the waterline of a ship, is then sighted through the fixed element 11 whilst the movable element 10 is displaced by rotating the milled head 34 through the cam 25 and cam lever 20, 21, until for instance the top of the vessel's mast viewed through the element 10 is brought into a line coinciding with the waterline of the ship as viewed through the fixed half 11 of the objective.

If the annular scale 28 has previously been set to indicate opposite the index 30 a known length or mast height by rotating the milled head 32, then the range will be automatically set up on the scale 27 opposite the fixed index 29 on outer scale.

It is often desirable, especially where through such a periscopic instrument a small field of view only is normally presented, to provide for varying the optical power of the instrument. This is particularly desirable in the periscopic range finding apparatus of the present invention because not only can this means be used for rapidly picking up an object, but it may even be used during range finding to provide a greater degree of contrast between the observed lengths and consequently ensure that when range finding with a certain degree of magnification a better degree of coincidence can be obtainable in practice.

A means for obtaining a magnification of image of the observed field of view is shown with reference to Figures 9 and 10 in which the lens 12 is carried in the sliding cell 39 capable of movement longitudinally in the sleeve 40 carried by the periscope tube. The sleeve 39 carries a pin 41 engaging a cam slot 42 in a disc 43 mounted in the side of the periscope tube 2 and geared with a pinion 44 on a spindle 45 carried by a milled head 46. The spindle 45 carries a further pinion 47 engaging a rectilinear rack 48 carried by a tube 49 mounted in the tube 40 and axially movable in the periscope tube 2. The tube or cell 49 carries the rear lens or combination 13.

The disc 43 carries a scale 50 co-operating with an index on a plate 51 on the side of the periscope tube to indicate the degree of magnification given by the optical combination 12, 13, so that the magnification power is immediately observable.

When using the means for magnification of the image it will be desirable to simultaneously alter the aperature. Accordingly, an iris or other like diaphragm 52 is mounted on a sleeve 53 having a cam slot 54 with which engages a pin 56 carried by the tube 40 which is connected to the tube 49. It will consequently be seen that motion of the lens 13 through the rack and pinion gear 47, 49 causes simultaneous displacement of the tube 40 axially of the periscope tube 2 and consequent operation of the iris diaphragm 52.

A diaphragm with cross wires may be carried, as shown at 57. This magnification effect may be obtained by the provision of a pancratic eyepiece separated from the periscope tube if desired.

In Figure 13 a modified arrangement is shown to that illustrated in Figures 9 and 10 whereby all the operating knobs are arranged at the lower end of the periscope tube. In this arrangement the lower end 21 of the cam lever 20, 21, co-operates, as in the above described constructions, with the face of a range cam 25 which is provided with a toothed periphery 58 engaging a pinion 59 mounted on a spindle 60 of a milled head 61 so that by turning this the optical element 10 can be displaced for range finding purposes as in the above constructions. Stops 62 are provided to prevent undue motion of the cam 25 in either direction. The cam also carries a spindle 63 on which is mounted a bevel wheel 64 meshing on the one hand with bevel teeth 65 on the range drum 66 the outside surface 67 of which is provided with graduations co-operating with a fixed index on the outer part 68 of the casing. On the other hand the bevel wheel 64 meshes with bevel teeth on a segment 69 having a toothed inner periphery co-operating with a pinion 70 of a spindle 71 passing over the other side of the apparatus and provided with a milled head 72. A friction brush 73 is mounted in the cam 25 co-operating with the surface on the casing so that when the milled head 72 is turned it will not normally operate the turning of the cam 25 through the bevel gearing 69, 64, but will turn the bevel wheel 64 about the spindle 63 to move the range drum 67 to a new position corresponding to the new value of mast height selected. Operation however, of the milled head 61 will move directly the cam 25 and the range drum.

The spindle 71 is further pinned to a pinion 74 gearing with an indicating ring 75 co-operating with a stationary index on a portion 76 of this side of the casing whereby the selected value of mast height will be always indicated opposite this index.

At a convenient place adjacent to the milled head 72 a further milled head 77 is provided on a sleeve 78 which has a pinion 79 arranged at one end gearing by intermediate wheels 80 with a pinion 81 on a spindle 82. The spindle 82 further carries a cam slot in which the pin 83 of a pinion 84 is mounted. The pinion 84 operates directly the displacement of the lens 12 forming one element of the optical combination forming the magnifying means as in the arrangement described with reference to Figure 10, whilst also on the spindle 82 is arranged a pinion 47 operating the rack 46, and thereby the displacement of the optical element 13 precisely in the manner described with reference to Figure 10. A disc 85 secured on the outer end of the spindle 82 has a graduated periphery co-operating with a fixed index on the part 86 of the casing so that the power of magnification at which the eyepiece stands at any particular moment can be immediately ascertained.

Figure 7:
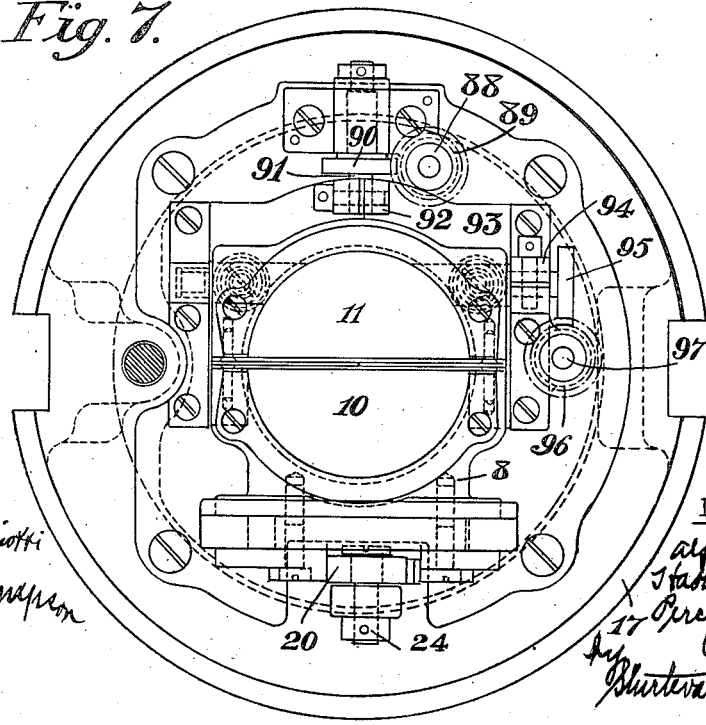
Figure 7 is a plan view corresponding to Figure 6.

It is desirable to provide means for zero setting of the fixed half of the range finder object glass. For this purpose the fixed half 11 is mounted on a compound slide having a small movement for zero setting in a direction parallel with the slit and a small movement in a direction at right angles to the slit to eliminate halving error. The movement for zero setting in a direction parallel to the slit is operated from a capstan head 87 which may be rotated by means of a tommy bar or the like and is mounted on a shaft 88 (Figures 3 and 6) extending upwards and carrying at its upper end a worm wheel 89 meshing with a gear 90 (Figures 6 and 7). The pinion 90 has a threaded end 91 engaging a threaded bush 92 on the slide 93 carrying the fixed half 11 of the range finding objective. The range slide 93 further carries in a plane at right angles to the plane of the bush 92 a second threaded bush 94 engaging the threaded spindle of a worm wheel 95 operated by a worm 96 on a spindle 97 similarly carrying a capstan head at the lower end and adapted to be operated by a tommy or the like for the purpose of obtaining the movement of the fixed half of the objective 11 relatively to the movable half 10 to eliminate halving error, that is to say, provides for a small movement of the fixed half of the lens at right angles to the slit.

The instrument illustrated more particularly in Figures 4, 5 and 8 is a form particularly applicable to submarines and consists of elements substantially similar to those above described. The upper and lower parts 98 and 99 of the periscope tube however, will be carried by a fixed bush 100 in the deck of the submarine or in its conning tower, and whilst in certain constructions it may be arranged to be rotatable it will not generally be capable of inclination relatively to the axis of the vessel.

The upper end 98 of the periscope tube carries a reflecting mirror 101 or prism adapted to reflect the light through 90°. A negative object glass 102 is combined therewith to be mounted either in front of or below the prism. This object glass forms a virtual image of the field of view which is picked up by an intermediate lens 103, 104, and projected down the long vertical tube 98, 99, forming another image at the focal plane which is viewed by the eyepiece 105. As shown, the intermediate lens is the one selected to be divided for range finding purposes. Fixed to the lower end 99 of the periscope tube is an erecting prism 106 or prisms reflecting rays through an angle of 90° into an ordinary Kellner or other eyepiece also fixed to the main tube.

The movable element 103 of the range finder objective is mounted on a slide having an arm 107 spring pressed against the surface of a cam 108 mounted in a bracket 109 on the sleeve 110 carried within the periscope tube 99. The spindle of the cam 108 carries a bevel wheel 111 meshing with a small bevel wheel on a spindle 112 passing down the periscope tube 99 and provided with a bevel pinion 113 at its lower end, which in turn gears with a similar bevel pinion on the spindle of a milled head 114. The bevel pinion 113 also meshes with a bevel gear 113', carried by the drum 117, as shown in Figure 5 of the drawings. By rotating therefore this milled head the movable objective 103 can be displaced for range finding purposes, the range corresponding to this displacement being indicated by an index 115 on a drum 116. A drum 117 is mounted to be rotatable relatively to the drum 116 and one side carries a scale 118 co-operating with the index 115 and on the other side an index 119 cooperating with a scale 120 on a further drum 121 rotatable about a spindle 122 carried by the periscope tube 99. The drum 121 carries a bush in which is mounted the spindle of a milled head 123 which has on its inner end a pinion engaging with a circular rack on the drum 117. Consequently it will be seen that by operating the milled head 123 the drum 117 can be set so that when the range is determined the reading given by the index 115 will be one corresponding to the selected predetermined "height" which is shown by the index 119. The scales 118, 120 are logarithmic so that by a simple preliminary operation of the milled head 123 to the set base length and then operation of the milled head 114, the range can be directly read from the indicator 115.

In this construction similar means are provided for correction of position of the fixed element 104 of the range finding objective of the periscope unit similar to that described with reference to Figures 3, 6 and 7.

Particularly with such constructions specially applicable for submarine use is it desirable to provide a means for correction of the range reading when fore-shortening of the image occurs owing to inclination of the periscope tube 98, 99, from the vertical. Accordingly the range drum 116 is mounted to be rotatable in ball bearings 124 in the lower end 99 of the periscope tube, the range drums, objective and other parts being carried on the bearings 124, 126, by a sleeve 125 (Figure 5). The range drum 116 passing within the periscope tube carries at its inner end a bevel segment 127 (Figure 8) which meshes with a further bevel sector 128 carried by a sleeve 129 turning about a bush 130 on the lower end 99 of the periscope tube. The sleeve 129 carries a pin 131 engaging in a slot 132 in a bush 130 carrying a diaphragm 134 having a line ruled upon it. By means of a handle 135 the range drum 116 is turned relatively to the lower end 99 of the periscope tube causing consequential rotation of the sleeve 133 and thereby the displacement of the line on the diaphragm 134, so that by operation of the handle 135 to keep the ruled line 134 always vertical or parallel to the observed mast, foreshortening will be automatically corrected, as the drums 117, 121 are prevented from rotating during movement of the drum 116 by handle 135 by a suitable selection of gearing. The bush 130 carries at its inner end the casing 136 for a double reflecting prism and is threaded to receive the eyepiece 105.

In the modifications illustrated in Figures 11 and 12 a home base range finder of the type having a single undivided observing telescope is combined with an observation periscope. The two optical squares 137, 138 cover half fields of view and reflect light respectively to the optical system comprising objective 139, reflecting prism 140, a further reflecting prism at the base of the periscope tube 141, to the eyepiece 142. Between the reflecting prisms 137 and 147 are refracting prisms for conveying the light or object from the prism 137 to the objective 139.

The element movable for range finding purposes in the arrangement shown consists of a rotating or swinging refracting prism 143 operated by rack and pinion gear 144 operated by a cam cut to a logarithmic curve 145 which is connected to one of a series of logarithmic scales 146 from which the range is directly readable. To place the range finding apparatus in inaction an optical square 147 duplicate to the member 138 is swung about a pivot 148 by means of gearing operated from a crank 150 to cut off the half field of view of the optical square 137 and the range finder scale 146 turned to zero. Consequently, the instrument then may be used as a true periscopic observation telescope.

We declare that what we claim is:—

1. An optical instrument comprising in combination a periscope, a range finder having an optical element movable for range finding purposes, means to co-ordinate the optical systems of said periscope and said range finder, and adjusting means to allow the use of the combined parts as a periscope presenting a complete uninterrupted field of view, or as an indirect vision range finder.

2. An optical instrument comprising a periscope, a range finder having an optical element movable for range finding purposes, means to co-ordinate the optical systems of said periscope and said range finder, an eyepiece adapted to receive light from each system, and means to pass a complete uninterrupted field of view to said eyepiece when said range finder is in inaction.

3. An optical instrument comprising a range finder having an optical element movable for range finding purposes, means to reflect light subsequent to passing through said system, an eyepiece receiving said light, and means to pass a complete uninterrupted field of view to said eyepiece when said range finder is in inaction.

4. An optical instrument comprising in combination a range finder, indirect sighting or periscopic means applied thereto, and means for correction of foreshortening of image due to deviation of the instrument relatively to a predetermined axis.

5. An optical instrument comprising a periscope, means for determining the range of objects sighted therethrough, and means to correct for foreshortening of the image due to deviation of the periscope axis from the predetermined position.

6. In a submarine vessel the combination of an observation periscope fixed relatively thereto, means for determining the range of objects sighted therethrough, and means to correct for foreshortening of the image due to deviation of the periscope axis from the predetermined position.

7. In a submarine vessel the combination of an extendible periscope fixed relatively thereto, means combined therewith for determining the range of objects sighted therethrough, and means to correct for foreshortening of the image due to deviation of the periscope axis from the predetermined position.

8. In a submarine vessel the combination of an observation periscope fixed relatively thereto, a range finding apparatus having an optical element movable for range finding purposes, means to pass light through said range finding apparatus which is subject to reflection by the elements of said periscope, and means for correction of foreshortening of image due to the deviation of the periscope axis from a predetermined position.

9. An optical instrument comprising in combination a periscope, a range finder, means to co-ordinate the optical systems of periscope and range finder so that light passing through the range finder is reflected by the periscope, and means to rotate the range finder element relatively to the axis of the periscope to correct for foreshortening of image due to deviation of disposition of the instrument from a predetermined axis.

10. An optical instrument comprising in combination a periscope, a range finder having an optical range finding element situated in the light axis of the periscope, and means to turn said range finder element symmetrically relatively to said light axis to correct for foreshortening of image due to deviation of said light axis from a predetermined disposition.

11. An optical instrument comprising a periscope, a range finder having an optical element movable for range finding purposes situated in the light axis of the periscope, and means to turn said range finder element symmetrically relatively to said light axis to correct for foreshortening of image due to deviation of said light axis from a predetermined disposition.

12. An optical instrument comprising in combination a periscope, a split objective in the light path of the periscope, means to move said objective for range finding purposes, a diaphragm having a line ruled thereon and situated in the light path, and means to rotate the diaphragm and the split objective simultaneously to correct for foreshortening of image due to deviation of the instrument from a predetermined disposition.

13. An optical instrument comprising in combination a periscope, a split objective in the light path of the periscope, means to move the objective for range finding purposes, an indicator for indicating said movement, a diaphragm having a line ruled thereon and situated in the axis of the light path, means to rotate the diaphragm and the split objective simultaneously, and means to interconnect said indicator and said means for rotating the objective to correct for foreshortening of image due to deviation of the instrument from a predetermined disposition.

14. An optical instrument comprising a periscope, a split objective in the light path of the periscope, means to displace the said objective in a plane at right angles to the light axis for range finding purposes, an indicator for indicating said movement, a diaphragm having a line ruled thereon and situated in the axis of the light path, means to rotate the diaphragm and the split objective simultaneously, and means to interconnect said indicator and said means for rotating the objective to correct for foreshortening of image due to deviation of the instrument from a predetermined disposition.

15. An optical instrument comprising a periscope, a split objective in the light path of the periscope, means to move said objective for range finding purposes, a logarithmic scale indicator, an index indicator co-operating therewith, means to connect one of said indicators with the means for moving the objective, means to rotate the objective in a plane at right-angles to the axis of the periscope, and means to interconnect said rotation means with one of said indicators to correct for foreshortening of image due to deviation of the instrument from a predetermined disposition.

16. An optical instrument comprising a periscope, a split objective in the light path of the periscope, means to move said objective for range finding purposes, a plurality of logarithmic scales co-operating with one another, an index indicator co-operating with one of said scales, means to connect one of said indicators with the means for moving the objective, means to rotate the objective in a plane at right angles to the axis of the periscope, and means to interconnect said rotation means with one of said indicators to correct for foreshortening of image due to deviation of the instrument from a predetermined disposition.

17. An optical instrument comprising in combination a periscope, a split objective in the light path of the periscope, a cam cut to a logarithmic curve for displacing the said objective for range finding purposes, an indicator for indicating said movement, a diaphragm having a line ruled thereon and situated in the axis of the light path, means to rotate the diaphragm and the split objective simultaneously, and means to interconnect said indicator and said means for rotating the objective to correct for foreshortening of image due to deviation of the instrument from a predetermined disposition.

18. An optical instrument comprising in combination a periscope, a split objective in the light path of the periscope, a cam cut to a logarithmic curve for displacing the said objective for range finding purposes, a plurality of logarithmic scales co-operating with one another, an index indicator co-operating with one of said scales, means to connect one of said indicators with the means for moving the objective, means to rotate the objective in a plane at right angles to the axis of the periscope, and means to interconnect said rotation means with one of said indicators to correct for foreshortening of image due to deviation of the instrument from a predetermined disposition.

19. An optical instrument comprising a periscope tube, means to reflect light at the upper end of said tube, a split objective in the light path of the periscope, means to move said objective for range finding purposes, a diaphragm having a line ruled thereon and situated in the light path, means to rotate the diaphragm and the split objective simultaneously to correct for foreshortening of image due to deviation of the instrument from a predetermined disposition, and means to reflect light at the bottom end of said periscope tube.

20. An optical instrument comprising a periscope tube, means to reflect light at the upper end of said tube, a split objective in the light path of the periscope, means to displace the said objective in a plane at right-angles to the light axis for range finding purposes, an indicator for indicating said movement, a diaphragm having a line ruled thereon and situated in the axis of the light path, means to rotate the diaphragm and the split objective simultaneously, means to interconnect said indicator and said means for rotating the objective to correct for foreshortening of image due to deviation of the instrument from a predetermined disposition, and means to reflect light at the bottom end of said periscope tube.

21. An optical instrument comprising a periscope tube, means to reflect light at the upper end of said periscope tube, a split objective in the light path of the periscope, a cam cut to a logarithmic curve for displacing the said objective for range finding purposes, a diaphragm having a line ruled thereon and situated in the light path, means to rotate the diaphragm and split objective simultaneously to correct for foreshortening of image due to deviation of the instrument from a predetermined disposition, means to reflect light at the bottom end of said periscope tube, a plurality of logarithmic scales co-operating with one another and situated at the bottom end of said periscope tube, an index indicator co-operating with one of said scales, and means to connect one of said indicators with the means for moving the objective.

22. An optical instrument comprising means to reflect light through a plurality of angles, a split lens in the light path, means to move a half portion of said lens for range finding purposes, a periscope tube containing said light reflecting means and said split lens, a range indicator at the bottom of said tube, and interconnecting means between said range indicator and said means for displacing said split half lens.

23. An optical instrument comprising means to reflect light through a plurality of angles, a split lens in the light path, a cam cut to a logarithmic curve to move a half portion of said lens for range finding purposes, a periscope tube containing said light reflecting means and said split lens, a range indicator at the bottom of said tube, and interconnecting means between said range indicator and said cam.

24. An optical instrument comprising means to reflect light through a plurality of angles, a split lens in the light path, a cam cut to a logarithmic curve to move a half portion of said lens for range finding purposes, a periscope tube containing said light reflecting means and said split lens, logarithmic scales at the bottom of said tube, and interconnecting means between said logarithmic scales and said cam.

25. An optical instrument comprising means to reflect light through a plurality of angles, a split lens in the light path, a cam cut to a logarithmic curve to move a half portion of said lens for range finding purposes, a periscope tube containing said light reflecting means and said split lens, logarithmic scales at the bottom of said tube, interconnecting means between one of said logarithmic scales and said cam, an operating head for turning said cam, a second operating head for adjusting one of said scales to vary said predetermined values, and differential gear between said first and second operating heads and said logarithmic cam.

26. An optical instrument comprising a periscope tube, a spherical bearing carrying said tube intermediate its length, a range finding apparatus having its optical element movable for range finding purposes arranged within said spherical bearing, means to reflect light through an angle at the top of said tube, and means to reflect light through an angle subsequent to passage through said range finding apparatus at the bottom of said tube.

27. An optical instrument comprising a periscope tube, a spherical bearing carrying said tube intermediate its length, a range finding apparatus having its optical element movable for range finding purposes arranged within said spherical bearing, means to reflect light through an angle at the top of said tube, means to reflect light through an angle subsequent to passage through said range finding apparatus at the bottom of said tube, a cam cut to a logarithmic curve to displace said movable optical element, longarithmic scales at the bottom of said periscope tube, and means inter-connecting said cam and said logarithmic scales.

28. An optical instrument comprising a periscope tube, a split objective midway along said tube, means to move the split half of said objective for range finding purposes, logarithmic scales at the bottom of said tube, means inter-connecting said split half objective moving means and said scales, means to reflect light through an angle previous to entering said split objective, means to reflect light through an angle subsequent to passage through said split objective, and means to correct the zero position of said split objective.

29. An optical instrument comprising in combination a periscope, a split objective in the light path of said periscope, means to move a split half of said objective for range finding purposes, a diaphragm having a line ruled thereon, and situated in the light path, means to rotate the diaphragm and the split objective simultaneously to correct for tilting of image due to deviation of the instrument from a predetermined disposition, and means to correct the zero position of the split halves of said objective.

30. An optical instrument comprising a periscope tube, light reflecting means at the top of said tube, a negative object glass at the top of said tube cooperating with said light reflecting means and projecting a virtual image of the field of view, an intermediate split lens receiving said image, a reflector reflecting said image received from said split lens, an eyepiece to receive said image, means to move the split half of the lens for range finding purposes, and means to indicate the amount of said movement.

31. An optical instrument comprising a periscope tube, light reflecting means at the top of said tube, a negative object glass subsequent to said reflector projecting a virtual image of the field of view, an intermediate split lens receiving said image, an erecting prism receiving an image from said split lens, an eyepiece receiving said erected image, means to move the split half of the lens for range finding purposes, and means to indicate the amount of said movement.

In witness whereof, we have hereunto signed our names this 13th day of January, 1916, in the presence of two subscribing witnesses.

ALFRED TAYLOR.
HAROLD DENNIS TAYLOR.
PERCY WILLIS GRAY.

Witnesses:
CHARLES DOWNEY,
CHARLES DOWNEY, The Younger.